US011177915B2

(12) United States Patent
Yang et al.

(10) Patent No.: US 11,177,915 B2
(45) Date of Patent: Nov. 16, 2021

(54) UPLINK REFERENCE SIGNAL SENDING METHOD, UPLINK REFERENCE SIGNAL METHOD, AND APPARATUS

(71) Applicant: HUAWEI TECHNOLOGIES CO., LTD., Guangdong (CN)

(72) Inventors: Xiaodong Yang, Shenzhen (CN); Wei Quan, Beijing (CN); Jian Zhang, Beijing (CN); Bingzhao Li, Beijing (CN)

(73) Assignee: Huawei Technologies Co., Ltd., Guangdong (CN)

( * ) Notice: Subject to any disclaimer, the term of this patent is extended or adjusted under 35 U.S.C. 154(b) by 0 days.

(21) Appl. No.: 16/188,713

(22) Filed: Nov. 13, 2018

(65) Prior Publication Data

US 2019/0081757 A1 Mar. 14, 2019

Related U.S. Application Data

(63) Continuation of application No. PCT/CN2016/082100, filed on May 13, 2016.

(51) Int. Cl.
*H04W 72/14* (2009.01)
*H04L 5/00* (2006.01)
(Continued)

(52) U.S. Cl.
CPC .......... *H04L 5/0048* (2013.01); *H04L 1/1812* (2013.01); *H04L 1/1822* (2013.01);
(Continued)

(58) Field of Classification Search
CPC .................................................... H04L 12/28
(Continued)

(56) References Cited

U.S. PATENT DOCUMENTS

2013/0039202 A1 2/2013 Martin et al.
2013/0250925 A1* 9/2013 Lohr ................. H04W 72/0446
370/336
(Continued)

FOREIGN PATENT DOCUMENTS

CN 102870365 A 1/2013
CN 102893679 A 1/2013
(Continued)

OTHER PUBLICATIONS

CN 102870365, Methods and systems for activating/disabling component carriers set up in communication systems that use carrier aggregation, pp. 1-27, Sep. 1, 2013.*
(Continued)

*Primary Examiner* — Dang T Ton
(74) *Attorney, Agent, or Firm* — Fish & Richardson P.C.

(57) ABSTRACT

The present invention provides an uplink reference signal sending method, and the method includes: sending, by a terminal device, an uplink reference signal on N1 second component carriers within a determined uplink reference signal sending time, and prohibiting, on M1 first component carriers in M first component carriers within the sending time, the terminal device from sending an uplink signal, where the first component carriers are carriers on which scheduling of uplink data transmission is allowed, and the second component carriers are carriers on which scheduling of uplink data transmission is prohibited. $N1 \le M1$, in other words, within the sending time, a quantity N1 of second component carriers on which the uplink reference signal is sent is less than or equal to a quantity M1 of first component carriers on which sending of the uplink signal is prohibited.

13 Claims, 5 Drawing Sheets

(51) Int. Cl.
  *H04L 1/18* (2006.01)
  *H04W 72/04* (2009.01)
  *H04W 74/08* (2009.01)

(52) U.S. Cl.
  CPC ............ *H04L 1/1887* (2013.01); *H04L 5/001* (2013.01); *H04L 5/0051* (2013.01); *H04W 72/0406* (2013.01); *H04W 72/0446* (2013.01); *H04W 72/0453* (2013.01); *H04W 72/14* (2013.01); *H04W 74/0833* (2013.01); *H04L 5/0053* (2013.01); *H04L 5/0094* (2013.01); *H04L 5/0098* (2013.01)

(58) Field of Classification Search
  USPC ........................................................ 370/329
  See application file for complete search history.

(56) References Cited

U.S. PATENT DOCUMENTS

| | | | |
|---|---|---|---|
| 2013/0342294 | A1 | 12/2013 | Gundersen Aarskog |
| 2014/0029586 | A1* | 1/2014 | Loehr ............... H04W 56/0005 370/336 |
| 2014/0362722 | A1 | 12/2014 | Joachim et al. |
| 2019/0182017 | A1 | 6/2019 | Feuersaenger et al. |

FOREIGN PATENT DOCUMENTS

| | | |
|---|---|---|
| EP | 2375618 A1 | 10/2011 |
| GN | 102457911 A | 5/2012 |
| JP | 2015181267 A | 10/2015 |
| WO | 2011098236 A1 | 8/2011 |
| WO | 2015122737 A1 | 8/2015 |
| WO | 2017165751 A1 | 9/2017 |
| WO | 2017173388 A1 | 10/2017 |

OTHER PUBLICATIONS

Office Action issued in Japanese Application No. 2018-559932 dated Oct. 8, 2019, 9 pages (with English translation).
3GPP TS 36.300 V13.3.0 (Mar. 2016);3rd Generation Partnership Project;Technical Specification Group Radio Access Network;Evolved Universal Terrestrial Radio Access (E-UTRA) and Evolved Universal Terrestrial Radio Access Network (E-UTRAN);Overall description;Stage 2(Release 13),total 295 pages.
3GPP TS 36.321 V13.1.0 (Mar. 2016);3rd Generation Partnership Project;Technical Specification Group Radio Access Network;Evolved Universal Terrestrial Radio Access (E-UTRA);Medium Access Control (MAC) protocol specification (Release 13),total 85 pages.
3GPP TS 36.331 V13.1.0 (Mar. 2016);3rd Generation Partnership Project;Technical Specification Group Radio Access Network;Evolved Universal Terrestrial Radio Access (E-UTRA); Radio Resource Control (RRC);Protocol specification (Release 13),total 551 pages.
3GPP TS 36.213 V13.1 1 (Mar. 2016);3rd Generation Partnership Project;Technical Specification Group Radio Access Network;Evolved Universal Terrestrial Radio Access (E-UTRA); Physical layer procedures(Release 13),total 361 pages.
3GPP TS 36.304 V13.1.0 (Mar. 2016);3rd Generation Partnership Project;Technical Specification Group Radio Access Network;Evolved Universal Terrestrial Radio Access (E-UTRA); User Equipment (UE) procedures in idle mode (Release 13),total 43 pages.
3GPP TS 36.212 V13.1.0 (Mar. 2016);3rd Generation Partnership Project;Technical Specification Group Radio Access Network;Evolved Universal Terrestrial Radio Access (E-UTRA);Multiplexing and channel coding(Release 13),total 129 pages.
International Search Report and Written Opinion issued in International Application No. PCT/CN2016/082100 dated Feb. 6, 2017, 16 pages.
Huawei et al: "Specification Impacts to Support SRS Carrier based Switching", 3GPP Draft; R1-162586, Apr. 2, 2016, XP051080274, 4 pages.
Huawei et al.: "General Operation of SRS Carrier Based Switching", 3GPP Draft; R1-182585, Apr. 2, 2016, XP051080273, 6 pages.
Qualcomm Incorporated: "Specification impact of supporting SRS switching", 3GPP Draft; R1-163055, Apr. 2, X016, XP051080499, 2 pages.
Extended European Search Report issued in European Application No. 16901344.8 dated Mar. 13, 2019, 13 pages.
Huawei et al., "General Operation of SRS Carrier Based Switching," 3GPP TSG RAN WG1 Meeting #84bis, R1-162585; Busan, Korean, XP051080273, Apr. 11-15, 2016, 6 pages.
3GPP TS 36.321 V11.2.0 (Mar. 2013), "3rd Generation Partnership Project; Technical Specification Group Radio Access Network;Evolved Universal Terrestrial Radio Access (E-UTRA); Medium Access Control (MAC) protocol specification (Release 11)," Mar. 2013, 56 pages.
Office Action issued in Korean Application No. 2018-7036253 dated Apr. 13, 2020, 10 pages (with English translation).
Office Action issued in Indian Application No. 201837042877 dated Dec. 17, 2020, 8 pages.

* cited by examiner

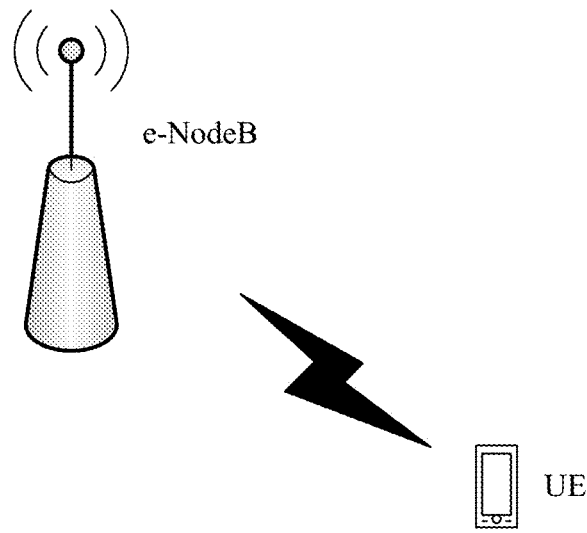

FIG. 2

A terminal device activates L component carriers, where the L component carriers include M first component carriers and N second component carriers, the first component carriers are carriers on which scheduling of uplink data transmission is allowed, the second component carriers are carriers on which scheduling of uplink data transmission is prohibited, L, M, and N are positive integers, and $L \geq 2$ ⸺ 300

The terminal device determines an uplink reference signal sending time ⸺ 301

The terminal device sends an uplink reference signal on N1 second component carriers within the sending time, where N1 is a positive integer and $N1 \leq N$; and the terminal device is prohibited, on M1 first component carriers within the sending time, from sending an uplink signal, where M1 is a positive integer and $N1 \leq M1 \leq M$ ⸺ 302

FIG. 3

UPLINK REFERENCE SIGNAL SENDING METHOD, UPLINK REFERENCE SIGNAL METHOD, AND APPARATUS

CROSS-REFERENCE TO RELATED APPLICATIONS

This application is a continuation of International Application No. PCT/CN2016/082100, filed on May 13, 2016, the disclosure of which is hereby incorporated by reference in its entirety.

TECHNICAL FIELD

The present invention relates to the field of communications systems, and especially, to an uplink reference signal sending method, an uplink reference signal receiving method, and an apparatus.

BACKGROUND

In a wireless communications system, a carrier aggregation (CA) technology allows user equipment (UE) to simultaneously send and receive data on a plurality of carriers. For example, in a Long Term Evolution (LTE) system, an evolved NodeB (eNB) configures a plurality of component carriers for the UE, and the UE may schedule uplink data transmission and downlink data transmission on the aggregated component carriers. However, because of a limited processing capability of the UE, only some of the aggregated component carriers are carriers on which scheduling of uplink data transmission is allowed, and the other aggregated component carriers are carriers on which scheduling of uplink data transmission is prohibited (the UE configures no uplink carrier for the other component carriers). To be specific, a maximum quantity of downlink carriers on which the UE can simultaneously receive data may be greater than a maximum quantity of uplink carriers on which the UE can simultaneously send data.

FIG. 1 is a schematic diagram of an aggregation case in which UE is configured with five component carriers in a time division duplex (TDD) LTE system. A component carrier 0 and a component carrier 1 on which scheduling of uplink data transmission is allowed include an uplink subframe, a downlink subframe, and a special subframe, and a component carrier 2, a component carrier 3, and a component carrier 4 are component carriers on which scheduling of uplink data transmission is prohibited. The TDD LTE system uses a duplex mode of time division multiplexing. Channel characteristics of an uplink channel and a downlink channel that operate in a same frequency band are similar, and a channel characteristic of a component carrier may be obtained by sending a sounding reference signal (SRS) on the component carrier on which scheduling of uplink data transmission is allowed. However, because the UE is configured with only two component carriers on which scheduling of uplink data transmission is allowed, the UE can send the SRS only on the two component carriers, and obtain channel characteristics of the two component carriers, but cannot obtain channel characteristics of other three component carriers on which scheduling of uplink data transmission is prohibited. In the prior art, the other three component carriers on which scheduling of uplink data transmission is prohibited need to be re-configured as component carriers on which scheduling of uplink data transmission is allowed, a quantity of component carriers on which scheduling of uplink data transmission is allowed and that are configured for the UE cannot exceed a processing capability of the UE, and the original component carriers on which scheduling of uplink data transmission is allowed further need to be configured as component carriers on which scheduling of uplink data transmission is prohibited (for example, the UE and/or a base station need/needs to delete, from a list of the configured component carriers on which scheduling of uplink data transmission is allowed, the original component carriers on which scheduling of uplink data transmission is allowed), so as to obtain the channel characteristics of the other three component carriers on which scheduling of uplink data transmission is prohibited. For example, because the UE configured with the five component carriers can support simultaneous sending of uplink data on a maximum of two of the five component carriers, the UE can be configured with a maximum of two component carriers on which scheduling of uplink data transmission is allowed. The UE needs to perform, at least twice, the foregoing process of re-configuring the component carriers for the UE, to obtain the channel characteristics of the other three component carriers on which scheduling of uplink data transmission is prohibited and that are of the UE. Consequently, a series of complex signaling interactions are generated and performance of the UE is severely affected.

SUMMARY

Embodiments of the present invention provide an uplink reference signal sending method, an uplink reference signal receiving method, and an apparatus, so as to efficiently report a channel characteristic of a component carrier of a terminal device.

According to a first aspect, an uplink reference signal sending method is provided, including:

activating, by a terminal device, L component carriers, where the L component carriers include M first component carriers and N second component carriers, the first component carriers are carriers on which scheduling of uplink data transmission is allowed, the second component carriers are carriers on which scheduling of uplink data transmission is prohibited, L, M, and N are positive integers, and $L \geq 2$;

determining, by the terminal device, an uplink reference signal sending time; and sending, by the terminal device, an uplink reference signal on N1 second component carriers within the sending time, where N1 is a positive integer and $N1 \leq N$; and prohibiting, on M1 first component carriers within the sending time, the terminal device from sending an uplink signal, where M1 is a positive integer and $N1 \leq M1 \leq M$.

Optionally, the sending time includes at least one orthogonal frequency division multiplexing (OFDM) symbol that is in a first subframe and that is used to send the uplink reference signal.

Optionally, the method further includes:

receiving, by the terminal device, first indication information from a network device, where the first indication information is used to indicate the N1 second component carriers and/or the M1 first component carriers.

Optionally, the first indication information includes carrier identifiers of the N1 second component carriers; or the first indication information includes a bitmap, the bitmap includes at least N bits, the N bits are corresponding to the N second component carriers, and the N bits are used to indicate the N1 second component carriers; or the N second component carriers are classified into a plurality of second component carrier groups, at least one of the second component carrier groups includes the N1 second component carriers, and the first indication information includes at least one bit to indicate one of the plurality of second component carrier groups.

Optionally, the first indication information is carried in a MAC control element (MAC CE), a first physical downlink control channel (PDCCH), or a radio resource control (RRC) message.

Optionally, the first subframe and/or the at least one OFDM symbol are/is preset; or the first subframe and/or the at least one OFDM symbol are/is configured by using higher layer signaling.

Optionally, the determining, by the terminal device, an uplink reference signal sending time includes: determining, by the terminal device, the uplink reference signal sending time according to the first indication information, where the first subframe is a next subframe of a subframe in which the first indication information is received; or the first subframe is an $(n+k)^{th}$ subframe, a subframe in which the first indication information is received is a subframe n, and k is preset; or the first subframe is an $(n+k)^{th}$ subframe, an $n^{th}$ subframe is a subframe n in which the first indication information is received, the first indication information further includes sending time information, and the sending time information is used to indicate k; or the N second component carriers are classified into a plurality of second component carrier groups, at least one of the second component carrier groups includes the N1 second component carriers, and different second component carrier groups are corresponding to different first subframes.

Optionally, the sending, by the terminal device, an uplink reference signal on N1 second component carriers within the sending time includes:

sending, by the terminal device, the uplink reference signal on the N1 second component carriers in P OFDM symbols in the first subframe; and the prohibiting, on M1 first component carriers within the sending time, the terminal device from sending an uplink signal includes:

prohibiting, on the M1 first component carriers in Q consecutive OFDM symbols, the terminal device from sending the uplink signal, where the Q OFDM symbols include the P OFDM symbols, and Q>P.

Different terminal devices have different processing capabilities, and due to a limited processing capability, a terminal device cannot implement zero-time switching. To be specific, the terminal device cannot send the uplink reference signal on the N1 component carriers at a same moment, and cannot be prohibited, on the M1 component carriers at the same moment, from sending the uplink signal. Therefore, a quantity Q of OFDM symbols in which sending of the uplink signal is prohibited on the M1 component carriers is greater than a quantity P of OFDM symbols in which the uplink reference signal is sent on the N1 component carriers, and the Q OFDM symbols in which sending of the uplink signal is prohibited on the M1 component carriers include the P OFDM symbols in which the uplink reference signal is sent on the N1 component carriers, so that a guard time can be reserved for the P OFDM symbols in which the uplink reference signal is sent, so as to avoid a sending conflict or a sending failure caused because the uplink reference signal is sent on the N1 component carriers at the same moment and sending of the uplink signal is prohibited on the M1 component carriers at the same moment.

Optionally, before the sending, by the terminal device, an uplink reference signal on N1 second component carriers within the sending time, the method further includes:

sending, by the terminal device, a preamble on at least one of the N1 second component carriers; and receiving, by the terminal device, a random access response (RAR) message corresponding to the preamble, where the RAR message includes information used to indicate an uplink timing advance (TA); or receiving, by the terminal device, second indication information corresponding to the preamble, where the second indication information is used to indicate a TA, and the second indication information does not include uplink control information.

Optionally, before the sending, by the terminal device, a preamble on at least one of the N1 second component carriers, the method further includes:

receiving, by the terminal device, configuration information sent by the network device, where the configuration information is used to indicate a random access resource of the at least one of the N1 second component carriers; and receiving, by the terminal device, random access control information sent by the network device by using a second PDCCH, where the random access control information is used to trigger the terminal device to send the preamble.

According to a second aspect, an uplink reference signal receiving method is provided, including:

configuring, by a network device, L component carriers for a terminal device, where the L component carriers include M first component carriers and N second component carriers, the first component carriers are carriers on which scheduling of uplink data transmission is allowed, the second component carriers are carriers on which scheduling of uplink data transmission is prohibited, L, M, and N are positive integers, and L≥2; and receiving, by the network device, an uplink reference signal from the terminal device on N1 second component carriers within an uplink reference signal sending time, where N1 is a positive integer and N1≤N; and determining, by the network device, that there is no uplink signal of the terminal device on M1 first component carriers within the sending time, where M1 is a positive integer and N1≤M1≤M.

Optionally, the network device receives the sending time from the terminal device, and the sending time is a time that is determined by the terminal device and that is used to send the uplink reference signal.

Optionally, the sending time includes at least one orthogonal frequency division multiplexing (OFDM) symbol that is in a first subframe and that is used to receive the uplink reference signal.

Optionally, the network device sends first indication information to the terminal device, where the first indication information is used to indicate the N1 second component carriers and/or the M1 first component carriers.

Optionally, the first indication information includes carrier identifiers of the N1 second component carriers; or the first indication information includes a bitmap, the bitmap includes at least N bits, the N bits are corresponding to the N second component carriers, and the N bits are used to indicate the N1 second component carriers; or the N second component carriers are classified into a plurality of second component carrier groups, at least one of the second component carrier groups includes the N1 second component carriers, and the first indication information includes at least one bit to indicate one of the plurality of second component carrier groups.

Optionally, the first indication information is carried in a MAC control element (MAC CE), a first PDCCH, or a radio resource control (RRC) message.

Optionally, the network device sends first configuration information to the terminal device by using higher layer signaling, and the first configuration information is used to configure the first subframe and/or the at least one OFDM symbol.

Optionally, the first indication information is used to indicate, for the terminal device, the sending time for sending the uplink reference signal; and the first subframe is a next subframe of a subframe in which the terminal device receives the first indication information; or the first subframe is an $(n+k)^{th}$ subframe, a subframe in which the terminal device receives the first indication information is a subframe n, and k is preset; or the first subframe is an $(n+k)^{th}$ subframe, an $n^{th}$ subframe is a subframe n in which the terminal device receives the first indication information, the first indication information further includes sending time information, and the sending time information is used to indicate k; or the N second component carriers are classified into a plurality of second component carrier groups, at least one of the second component carrier groups includes the N1 second component carriers, and different second component carrier groups are corresponding to different first subframes.

Optionally, the receiving, by the network device, an uplink reference signal on N1 second component carriers within a sending time includes:

receiving, by the network device, the uplink reference signal on the N1 second component carriers in P OFDM symbols in the first subframe; and the determining, by the network device, that there is no uplink signal of the terminal device on M1 first component carriers within the sending time includes:

prohibiting, on the M1 first component carriers in Q consecutive OFDM symbols, the network device from receiving an uplink signal, where the Q OFDM symbols include the P OFDM symbols, and Q>P.

Optionally, before the receiving, by the network device, an uplink reference signal on N1 second component carriers within a sending time, the method further includes:

receiving, by the network device, a preamble on at least one of the N1 second component carriers; and sending, by the network device, a random access response (RAR) message corresponding to the preamble, where the RAR message includes information used to indicate an uplink timing advance (TA); or sending, by the network device, second indication information corresponding to the preamble, where the second indication information is used to indicate a TA, and the second indication information does not include uplink control information.

Optionally, before the receiving, by the network device, a preamble on at least one of the N1 second component carriers, the method further includes:

sending, by the network device, second configuration information to the terminal device, where the second configuration information is used to indicate a random access resource of the at least one of the N1 second component carriers; and sending, by the network device, random access control information to the terminal device by using a second PDCCH, where the random access control information is used to trigger the terminal device to send the preamble.

According to a third aspect, a terminal device is provided, including a processor and a transceiver, where the processor is configured to: activate L component carriers, where the L component carriers include M first component carriers and N second component carriers, the first component carriers are carriers on which scheduling of uplink data transmission is allowed, the second component carriers are carriers on which scheduling of uplink data transmission is prohibited, L, M, and N are positive integers, and L≥2; and determine an uplink reference signal sending time;

the transceiver is configured to send an uplink reference signal on N1 second component carriers within the sending time, where N1 is a positive integer and N1≤N; and the processor is configured to be prohibited, on M1 first component carriers within the sending time, from sending an uplink signal, where M1 is a positive integer and N1≤M1≤M.

Optionally, the sending time includes at least one orthogonal frequency division multiplexing (OFDM) symbol that is in a first subframe and that is used to send the uplink reference signal.

Optionally, the transceiver is further configured to receive first indication information from a network device, where the first indication information is used to indicate the N1 second component carriers.

Optionally, the first indication information includes carrier identifiers of the N1 second component carriers; or the first indication information includes a bitmap, the bitmap includes at least N bits, the N bits are corresponding to the N second component carriers, and the N bits are used to indicate the N1 second component carriers; or the N second component carriers are classified into a plurality of second component carrier groups, at least one of the second component carrier groups includes the N1 second component carriers, and the first indication information includes at least one bit to indicate one of the plurality of second component carrier groups.

Optionally, the first indication information is carried in a Media Access Control control element (MAC CE), a first PDCCH, or a radio resource control (RRC) message.

Optionally, the first subframe and/or the at least one OFDM symbol are/is preset; or the first subframe and/or the at least one OFDM symbol are/is configured by using higher layer signaling.

Optionally, the processor is further configured to determine the uplink reference signal sending time according to the first indication information; and the first subframe is a next subframe of a subframe in which the first indication information is received; or the first subframe is an $(n+k)^{th}$ subframe, a subframe in which the first indication information is received is a subframe n, and k is preset; or the first subframe is an $(n+k)^{th}$ subframe, an $n^{th}$ subframe is a subframe n in which the first indication information is received, the first indication information further includes sending time information, and the sending time information is used to indicate k; or the N second component carriers are classified into a plurality of second component carrier groups, at least one of the second component carrier groups includes the N1 second component carriers, and different second component carrier groups are corresponding to different first subframes.

Optionally, the transceiver is further configured to send the uplink reference signal on the N1 second component carriers in P OFDM symbols in the first subframe; and the processor is further configured to be prohibited, on the M1 first component carriers in Q consecutive OFDM symbols, from sending the uplink signal, where the Q OFDM symbols include the P OFDM symbols, and Q>P.

Optionally, the transceiver is further configured to: before the terminal device sends the uplink reference signal on the N1 second component carriers within the sending time, send a preamble on at least one of the N1 second component carriers; and the transceiver is further configured to receive a random access response (RAR) message corresponding to the preamble, where the RAR message includes information used to indicate an uplink timing advance (TA); or the transceiver is further configured to receive second indication information corresponding to the preamble, where the second indication information is used to indicate a TA, and the second indication information does not include uplink control information.

Optionally, the transceiver is further configured to: before sending the preamble on the at least one of the N1 second component carriers, receive configuration information sent by the network device, where the configuration information is used to indicate a random access resource of the at least one of the N1 second component carriers; and the transceiver is further configured to receive random access control information sent by the network device by using a second PDCCH, where the random access control information is used to trigger the transceiver to send the preamble.

According to a fourth aspect, a network device is provided, including a processor and a transceiver, where the processor is adapted to configure L component carriers for a terminal device, where the L component carriers include M first component carriers and N second component carriers, the first component carriers are carriers on which scheduling of uplink data transmission is allowed, the second component carriers are carriers on which scheduling of uplink data transmission is prohibited, L, M, and N are positive integers, and L≥2;

the transceiver is configured to receive an uplink reference signal from the terminal device on N1 second component carriers within an uplink reference signal sending time, where N1≤N; and the processor is configured to determine that there is no uplink signal of the terminal device on M1 first component carriers within the sending time, where M1 is a positive integer and N1≤M1≤M.

Optionally, the sending time includes at least one orthogonal frequency division multiplexing (OFDM) symbol that is in a first subframe and that is used to receive the uplink reference signal.

Optionally, the transceiver is further configured to send first indication information to the terminal device, where the first indication information is used to indicate the N1 second component carriers.

Optionally, the first indication information includes carrier identifiers of the N1 second component carriers; or the first indication information includes a bitmap, the bitmap includes at least N bits, the N bits are corresponding to the N second component carriers, and the N bits are used to indicate the N1 second component carriers; or the N second component carriers are classified into a plurality of second component carrier groups, at least one of the second component carrier groups includes the N1 second component carriers, and the first indication information includes at least one bit to indicate one of the plurality of second component carrier groups.

Optionally, the first indication information is carried in a MAC CE, a first PDCCH, or a radio resource control (RRC) message.

Optionally, the transceiver sends first configuration information to the terminal device by using higher layer signaling, and the first configuration information is used to configure the first subframe and/or the at least one OFDM symbol.

Optionally, the first indication information is used to indicate, for the terminal device, the sending time for sending the uplink reference signal; and the first subframe is a next subframe of a subframe in which the terminal device receives the first indication information; or the first subframe is an $(n+k)^{th}$ subframe, a subframe in which the terminal device receives the first indication information is a subframe n, and k is preset; or the first subframe is an $(n+k)^{th}$ subframe, an $n^{th}$ subframe is a subframe n in which the terminal device receives the first indication information, the first indication information further includes sending time information, and the sending time information is used to indicate k; or the N second component carriers are classified into a plurality of second component carrier groups, at least one of the second component carrier groups includes the N1 second component carriers, and different second component carrier groups are corresponding to different first subframes.

Optionally, the transceiver is further configured to receive the uplink reference signal on the N1 second component carriers in P OFDM symbols in the first subframe; and the processor is further configured to determine that there is no uplink signal of the terminal device on the M1 first component carriers in Q consecutive OFDM symbols, where the Q OFDM symbols include the P OFDM symbols, and Q>P.

Optionally, the transceiver is further configured to: before receiving the uplink reference signal on the N1 second component carriers within the sending time, receive a preamble on at least one of the N1 second component carriers; and the transceiver is further configured to send a random access response RAR message on the at least one second component carrier on which the preamble is received, where the RAR message includes information used to indicate an uplink timing advance TA; or the transceiver is further configured to send second indication information on the at least one second component carrier on which the preamble is received, where the second indication information is used to indicate a TA, and the second indication information does not include uplink control information.

Optionally, the transceiver is further configured to: before receiving the preamble on the at least one of the N1 second component carriers, send second configuration information to the terminal device, where the second configuration information is used to indicate a random access resource of the at least one of the N1 second component carriers; and the transceiver is further configured to send random access control information to the terminal device by using a second PDCCH, where the random access control information is used to trigger the terminal device to send the preamble.

According to a fifth aspect, a method for obtaining an uplink timing advance TA is provided, including:

sending, by a terminal device, a preamble to a network device on at least one of activated second component carriers, where the second component carrier is a carrier on which scheduling of uplink data transmission is prohibited; and receiving, by the terminal device, second indication information corresponding to the preamble, where the second indication information is used to indicate the TA.

In the foregoing technical solution, the terminal device can send, to the network device, the preamble on the component carrier on which scheduling of uplink data transmission is prohibited, to obtain the uplink TA.

Optionally, the second indication information does not include uplink control information.

Therefore, the terminal device receives the second indication information corresponding to the preamble, where the second indication information is used to indicate the TA, and the second indication information does not include uplink control information. This may avoid configuring uplink control information for the component carrier on which scheduling of uplink data transmission is not required or not allowed.

Optionally, the second indication information is an RAR message, and a value corresponding to uplink control information in the RAR message is "0".

Optionally, the second indication information is an RAR message, and the terminal device ignores uplink control information in the RAR message.

Optionally, before the sending, by a terminal device, a preamble on at least one of activated second component carriers, the method further includes: receiving, by the terminal device, configuration information from the network device, where the configuration information is used to indicate a random access resource of the at least one second component carrier; and receiving, by the terminal device, random access control information sent by the network device by using a physical downlink control channel (PDCCH), where the random access control information is used to trigger the terminal device to send the preamble.

According to a sixth aspect, a method for sending an uplink timing advance (TA) is provided, including:

receiving, by a network device, a preamble from a terminal device on at least one of second component carriers, where the second component carrier is a carrier on which scheduling of uplink data transmission is prohibited;

generating, by the network device, second indication information corresponding to the preamble, where the second indication information is used to indicate the TA; and sending, by the network device, the second indication information to the terminal device.

Optionally, the second indication information does not include uplink control information.

Optionally, the second indication information is an RAR message, and a value corresponding to uplink control information in the RAR message is "0".

Optionally, the second indication information is an RAR message, and the terminal device ignores uplink control information in the RAR message.

According to a seventh aspect, a terminal device is provided, where the terminal device includes a processor and a transceiver;

the transceiver is configured to send a preamble to a network device on at least one of activated second component carriers, where the second component carrier is a carrier on which scheduling of uplink data transmission is prohibited; and the transceiver is further configured to receive, from the network device, second indication information corresponding to the preamble, where the second indication information is used to indicate a TA.

Optionally, the second indication information does not include uplink control information.

Optionally, the second indication information is an RAR message, and a value corresponding to uplink control information in the RAR message is "0".

Optionally, the second indication information is an RAR message, and the processor is configured to ignore uplink control information in the RAR message.

Optionally, before sending the preamble on the at least one of the activated second component carriers, the transceiver is further configured to: receive configuration information from the network device, where the configuration information is used to indicate a random access resource of the at least one second component carrier; and receive random access control information sent by the network device by using a physical downlink control channel (PDCCH), where the random access control information is used to trigger the transceiver to send the preamble.

According to an eighth aspect, a network device is provided, where the network device includes a processor and a transceiver;

the transceiver is configured to receive a preamble from a terminal device on at least one of second component carriers, where the second component carrier is a carrier on which scheduling of uplink data transmission is prohibited;

the processor is configured to generate second indication information corresponding to the preamble, where the second indication information is used to indicate a TA; and the transceiver is further configured to send the second indication information to the terminal device.

Optionally, the second indication information does not include uplink control information.

Optionally, the second indication information is an RAR message, and a value corresponding to uplink control information in the RAR message is "0".

Optionally, the second indication information is an RAR message, and the terminal device ignores uplink control information in the RAR message.

In the technical solutions in the embodiments of the present invention, the L component carriers activated by the terminal device include the M first component carriers on which scheduling of uplink data transmission is allowed and the N second component carriers on which scheduling of uplink data transmission is prohibited. The terminal device sends the uplink reference signal on the N1 second component carriers within the determined uplink reference signal sending time, and is prohibited, on the M1 first component carriers in the M first component carriers within the sending time, from sending the uplink signal. Because N1≤M1, it is ensured that a quantity of component carriers on which the uplink signal is sent within the sending time does not exceed a processing capability of the terminal device, and there is no need to re-configure, for the terminal device, the component carriers on which scheduling of uplink data transmission is allowed and the component carriers on which scheduling of uplink data transmission is prohibited, so as to avoid corresponding signaling overheads and a complex processing procedure, and efficiently report channel characteristics of the component carriers of the terminal device.

In addition, embodiments of the present invention provide an uplink data sending method, an uplink data receiving method, and an apparatus, so as to complete uplink data sending and retransmission, thereby ensuring random access performance.

According to a ninth aspect, an uplink data sending method is provided, including:
sending, by a terminal device, a random access preamble;
receiving, by the terminal device, a random access response, where the random access response includes a first uplink grant; and
sending, by the terminal device, uplink data based on the first uplink grant, where the terminal device sends the uplink data by using a pre-configured hybrid automatic repeat request (HARQ) process.

Optionally, if the HARQ process is used for sending both the uplink data and other uplink data, the terminal device sends the uplink data by using the HARQ process; and further, optionally, the terminal device clears the other uplink data from a cache corresponding to the HARQ process.

Optionally, after the sending, by the terminal device, uplink data, the method further includes:
receiving, by the terminal device, a second uplink grant, where the second uplink grant includes an identifier of the pre-configured HARQ process; and
retransmitting, by the terminal device, the uplink data by using the pre-configured HARQ process based on the second uplink grant.

Optionally, after the sending, by the terminal device, uplink data, the method further includes:
receiving, by the terminal device, a second uplink grant, where the second uplink grant does not include an identifier of the HARQ process; and
retransmitting, by the terminal device, the uplink data by using the pre-configured HARQ process based on the second uplink grant.

Optionally, after the sending, by the terminal device, uplink data, the method further includes:
receiving, by the terminal device, a second uplink grant, where the second uplink grant includes an identifier of any HARQ process; and
ignoring, by the terminal device based on the second uplink grant, the identifier that is of the HARQ process and that is included in the second uplink grant, and retransmitting the uplink data by using the pre-configured HARQ process.

Optionally, the identifier of the pre-configured hybrid automatic repeat request HARQ process may be 0 or 1, or may be selected by the terminal device.

According to a tenth aspect, an uplink data receiving method is provided, including:
receiving, by a network device, a random access preamble;
sending, by the network device, a random access response, where the random access response includes a first uplink grant; and
receiving, by the network device, uplink data sent by a terminal device based on the first uplink grant, where the terminal device sends the uplink data by using a pre-configured hybrid automatic repeat request (HARQ) process.

Optionally, after the network device receives the uplink data, if the network device fails to receive the uplink data, the method further includes:
sending, by the network device, a second uplink grant, where the second uplink grant includes an identifier of the pre-configured HARQ process; and
receiving, by the network device, the uplink data retransmitted by the terminal device by using the pre-configured HARQ process based on the second uplink grant.

Optionally, after the network device receives the uplink data, if the network device fails to receive the uplink data, the method further includes:
sending, by the network device, a second uplink grant, where the second uplink grant does not include an identifier of the HARQ process; and
receiving, by the network device, the uplink data retransmitted by the terminal device by using the pre-configured HARQ process based on the second uplink grant.

Optionally, after the network device receives the uplink data, if the network device fails to receive the uplink data, the method further includes:
sending, by the network device, a second uplink grant, where the second uplink grant includes an identifier of any HARQ process; and
receiving, by the network device, the uplink data retransmitted by the terminal device by using the pre-configured HARQ process based on the second uplink grant, where the terminal device ignores the identifier that is of the HARQ process and that is included in the second uplink grant.

Optionally, the identifier of the pre-configured hybrid automatic repeat request HARQ process may be 0 or 1, or may be selected by the terminal device.

According to an eleventh aspect, a terminal device is provided, including a transceiver, where
the transceiver is configured to send a random access preamble;
the transceiver is configured to receive a random access response, where the random access response includes a first uplink grant; and
the transceiver is configured to send uplink data based on the first uplink grant, where the transceiver sends the uplink data by using a pre-configured hybrid automatic repeat request HARQ process.

Optionally, the transceiver is further configured to: if the HARQ process is used for sending both the uplink data and other uplink data, send the uplink data by using the HARQ process; and further, optionally, clear the other uplink data from a cache corresponding to the HARQ process.

Optionally, after the terminal device sends the uplink data, the transceiver is further configured to:
receive a second uplink grant, where the second uplink grant includes an identifier of the pre-configured HARQ process; and
retransmit the uplink data by using the pre-configured HARQ process based on the second uplink grant.

Optionally, after the terminal device sends the uplink data, the transceiver is further configured to:
receive a second uplink grant, where the second uplink grant does not include an identifier of the HARQ process; and
retransmit the uplink data by using the pre-configured HARQ process based on the second uplink grant.

Optionally, after the terminal device sends the uplink data, the transceiver is further configured to:
receive a second uplink grant, where the second uplink grant includes an identifier of any HARQ process; and
ignore, based on the second uplink grant, the identifier that is of the HARQ process and that is included in the second uplink grant, and retransmit the uplink data by using the pre-configured HARQ process.

Optionally, the identifier of the pre-configured hybrid automatic repeat request HARQ process may be 0 or 1, or may be selected by the terminal device.

According to a twelfth aspect, a network device is provided, including a transceiver, where
the transceiver is configured to receive a random access preamble;
the transceiver is configured to send a random access response, where the random access response includes a first uplink grant; and
the transceiver is configured to receive uplink data sent by a terminal device based on the first uplink grant, where the terminal device sends the uplink data by using a pre-configured hybrid automatic repeat request (HARQ) process.

Optionally, after the network device receives the uplink data, if the network device fails to receive the uplink data, the transceiver is further configured to:
send a second uplink grant, where the second uplink grant includes an identifier of the pre-configured HARQ process; and
receive the uplink data retransmitted by the terminal device by using the pre-configured HARQ process based on the second uplink grant.

Optionally, after the network device receives the uplink data, if the network device fails to receive the uplink data, the transceiver is further configured to:
send a second uplink grant, where the second uplink grant does not include an identifier of the HARQ process; and
receive the uplink data retransmitted by the terminal device by using the pre-configured HARQ process based on the second uplink grant.

Optionally, after the network device receives the uplink data, if the network device fails to receive the uplink data, the transceiver is further configured to:
send a second uplink grant, where the second uplink grant includes an identifier of any HARQ process; and
receive the uplink data retransmitted by the terminal device by using the pre-configured HARQ process based on the second uplink grant, where the terminal device ignores the identifier that is of the HARQ process and that is included in the second uplink grant.

Optionally, the identifier of the pre-configured hybrid automatic repeat request (HARQ) process may be 0 or 1, or may be selected by the terminal device.

In the embodiments of the present invention, the terminal device easily determines which HARQ process is used to transmit the uplink data. In addition, the network device also easily determines which HARQ process is used to instruct the terminal device to retransmit the uplink data, so as to ensure reliability of the uplink data, and avoid a problem that because the identifier of the HARQ process is added to the uplink grant in the random access response, a size of a random access response message is increased, and the terminal device cannot properly receive the random access response message.

BRIEF DESCRIPTION OF DRAWINGS

FIG. 2 is a communication scenario diagram according to an embodiment of the present invention;

FIG. 3 is a first schematic example diagram according to an embodiment of the present invention;

DESCRIPTION OF EMBODIMENTS

Figure 1:
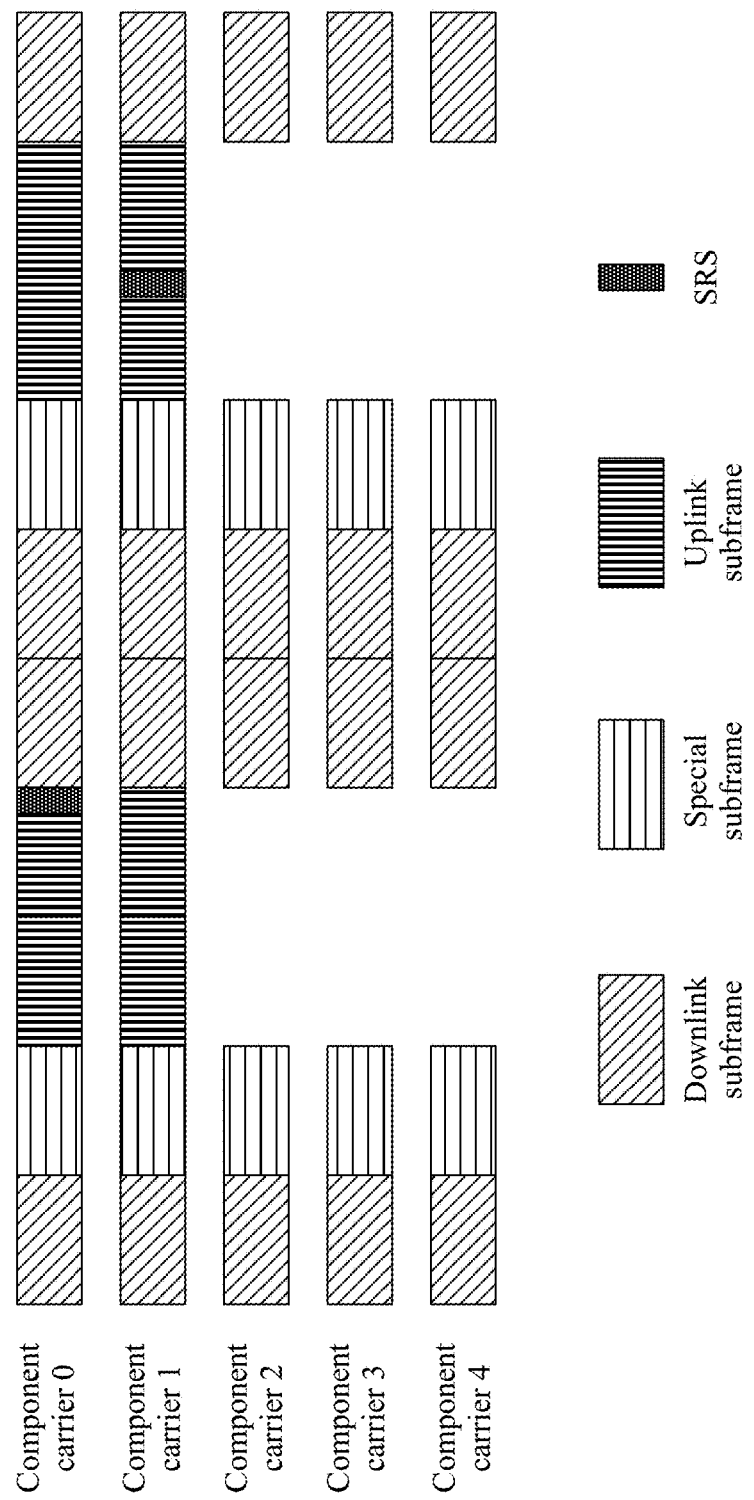
FIG. 1 is a schematic diagram of sending an uplink reference signal in the prior art.

Embodiments of the present invention may be applied to a wireless communications system that includes a network device and a terminal device (terminal device or terminal equipment). The terminal device may be a device that provides voice and/or data connectivity for a user, a handheld device having a wireless connection function, or another processing device connected to a wireless modem. The wireless terminal may communicate with one or more core networks by using a radio access network (RAN). The wireless terminal may be a mobile terminal, such as a mobile phone (or referred to as a "cellular" phone) or a computer having a mobile terminal. For example, the wireless terminal may be a portable, pocket-sized, handheld, computer built-in, or in-vehicle mobile apparatus that exchanges voice and/or data with the radio access network. For example, the wireless terminal may be a device such as a personal communications service (PCS) phone, a cordless phone, a Session Initiation Protocol (SIP) phone, a wireless local loop (WLL) station, or a personal digital assistant (PDA). The wireless terminal may also be referred to as a system, a subscriber unit (SU), a subscriber station (SS), a mobile station (MS), a mobile console, a remote station (RS), an access point (AP), a remote terminal (RT), an access terminal (AT), a user terminal (UT), a user agent (UA), a user device, or user equipment (UE). The network device may be a base station, an enhanced base station, a relay having a scheduling function, a device having a base station function, or the like. The base station may be an evolved NodeB (eNB or eNodeB) in an LTE system, or a base station in another system. This is not limited in the embodiments of the present invention. The following embodiments are described by using an example in which the terminal device is the UE and the network device is the eNB.

It should be noted that the embodiments of the present invention are described by using a TDD LTE system as an example. However, it does not mean that the embodiments of the present invention are applicable only to the TDD LTE system. Actually, technical solutions provided in the embodiments of the present invention may be applied to any TDD communications system.

The following further describes the embodiments of the present invention with reference to accompanying drawings and implementations, so as to enable a person skilled in the art to better understand the solutions in the embodiments of the present invention.

FIG. 2 is a schematic scenario diagram of a communications system in which an embodiment of the present invention may be implemented. It should be noted that the communications system in FIG. 2 is merely a scenario, provided to describe this embodiment of the present invention more clearly, in which this embodiment of the present invention may be implemented, and is not intended to limit an application scope of this embodiment of the present invention.

For example, FIG. 2 shows an evolved NodeB (eNB or eNodeB) and user equipment (UE) in an LTE system. The UE may send data to the eNB, and may further receive data from the eNB. It should be noted that another communications system to which this embodiment of the present invention may be applied may include more terminal devices, and may further include more network devices.

Optionally, in the LTE system, one radio frame includes 10 subframes, a length of each subframe is 1 millisecond, each subframe includes two timeslots, and each timeslot is 0.5 millisecond.

A quantity of symbols included in each timeslot is related to a length of a cyclic prefix (CP) in a subframe. If the CP is a normal CP, each slot includes seven symbols, and each subframe includes 14 symbols. For example, each subframe includes symbols whose sequence numbers are respectively #0, #1, #2, #3, #4, #5, #6, #7, #8, #9, #10, #11, #12, and #13. If the CP is an extended CP, each timeslot includes six symbols, and each subframe includes 12 symbols. For example, each subframe includes symbols whose sequence numbers are respectively #0, #1, #2, #3, #4, #5, #6, #7, #8, #9, #10, and #11.

In this embodiment of the present invention, both an uplink symbol and a downlink symbol are referred to as a symbol. For example, the uplink symbol may be a single carrier frequency division multiple access (SC-FDMA) symbol, or may be an orthogonal frequency division multiplexing (OFDM) symbol; and the downlink symbol may be an orthogonal frequency division multiplexing (OFDM) symbol.

FIG. 3 is a flowchart of an uplink reference signal sending method according to an embodiment of the present invention. The method in FIG. 3 is performed by a terminal device (for example, the UE in FIG. 2).

Step 300: The terminal device activates L component carriers, where the L component carriers include M first component carriers and N second component carriers, the first component carriers are carriers on which scheduling of uplink data transmission is allowed, the second component carriers are carriers on which scheduling of uplink data transmission is prohibited, L, M, and N are positive integers, and L≥2.

Step 301: The terminal device determines an uplink reference signal sending time.

Step 302: The terminal device sends an uplink reference signal on N1 second component carriers within the sending time, where N1 is a positive integer and N1≤N; and the terminal device is prohibited, on M1 first component carriers within the sending time, from sending an uplink signal, where M1 is a positive integer and N1≤M1≤M.

For example, the first component carriers include a carrier corresponding to a primary cell configured for the terminal device, the second component carriers include a carrier corresponding to a secondary cell configured for the terminal device, and the carrier or a component carrier may also be referred to as a cell. This embodiment of the present invention is not limited thereto, provided that scheduling of uplink data transmission is allowed on the first component carriers, and scheduling of uplink data transmission is prohibited on the second component carriers. It should be noted that this description is also applicable to another embodiment.

For example, the uplink reference signal may be a sounding reference signal (SRS), but this embodiment of the present invention is not limited thereto; or the uplink reference signal may be another type of reference signal.

In the foregoing technical solution, the L component carriers activated by the terminal device include the M first component carriers on which scheduling of uplink data transmission is allowed and the N second component carriers on which scheduling of uplink data transmission is prohibited. It may be considered that a quantity M of component carriers on which scheduling of uplink data transmission is allowed and that are activated by the terminal device does not exceed a processing capability of the terminal device. The terminal device sends the uplink reference signal on the N1 second component carriers within the determined uplink reference signal sending time, and is prohibited, on the M1 first component carriers in the M first component carriers within the sending time, from sending the uplink signal. Because N1≤M1, namely, within the sending time, a quantity N1 of second component carriers on which the uplink reference signal is sent is less than or equal to a quantity M1 of first component carriers on which sending of the uplink signal is prohibited, it can be ensured that a quantity M+N1−M1 of component carriers on which the uplink signal is sent within the sending time is still less than or equal to M, it is ensured that the quantity of component carriers on which the uplink signal is sent within the sending time does not exceed the processing capability of the terminal device, and there is no need to re-configure, for the terminal device, the component carriers on which scheduling of uplink data transmission is allowed and the component carriers on which scheduling of uplink data transmission is prohibited, so as to avoid corresponding signaling overheads and a complex processing procedure, and efficiently report channel characteristics of the component carriers of the terminal device.

Optionally, the terminal device may notify a network device of the determined uplink reference signal sending time. In this way, the network device can obtain a time for sending the uplink reference signal by the terminal device.

In an optional embodiment, the uplink reference signal sending time determined by the terminal device in step 301 may include at least one OFDM symbol that is in a first subframe and that is used to send the uplink reference signal.

For example, the sending time during which the terminal device sends the uplink reference signal on the N1 second component carriers may be any OFDM symbol in the first subframe, or may be a plurality of OFDM symbols or all OFDM symbols in the first subframe. When the terminal device sends the uplink reference signal on all the OFDM symbols in the first subframe, it may also be considered that the uplink reference signal sending time determined by the terminal device is the first subframe. Optionally, the sending time may further include at least one OFDM symbol in a second subframe. For example, the sending time during which the terminal device sends the uplink reference signal on the N1 second component carriers may be last three OFDM symbols in the first subframe and first two OFDM symbols in the second subframe. It should be noted that the first subframe may be one subframe, or may be a plurality of subframes, for example, the last subframe in each radio frame. In this case, the first subframe is periodic. Similarly, the second subframe may be one subframe, or may be a plurality of subframes, for example, the first subframe in each radio frame. In this case, the second subframe is periodic.

It should be noted that, in this embodiment of the present invention, the at least one OFDM symbol in the first subframe is time domain in which the terminal device sends the uplink reference signal on the N1 second component carriers. Both a case in which the terminal device sends the uplink reference signal in the at least one OFDM symbol in the first subframe on the N1 second component carriers and a case in which the terminal device sends the uplink reference signal on the N1 second component carriers in the at least one OFDM symbol in the first subframe indicate that the terminal device sends the uplink reference signal separately on the N1 second component carriers in time domain of "the at least one OFDM symbol in the first subframe".

Optionally, the first subframe and/or the at least one OFDM symbol are/is preset. For example, the first subframe may be preset to any subframe in one radio frame or any subframe in each radio frame, so that the uplink reference signal is sent in the at least one OFDM symbol in the preset first subframe. For example, the at least one OFDM symbol may be preset to first three OFDM symbols in one subframe, so that the uplink reference signal is sent in the first three OFDM symbols in the first subframe after the first subframe is determined. For example, in an embodiment, the first subframe and the at least one OFDM symbol may be preset to the last subframe in each radio frame and the last OFDM symbol.

Optionally, the first subframe and/or the at least one OFDM symbol are/is configured by using higher layer signaling. For example, the first subframe may be configured as any subframe in one radio frame or a plurality of radio frames by using the higher layer signaling, so that the uplink reference signal is sent in the at least one OFDM symbol in the configured first subframe. For example, the at least one OFDM symbol may be configured as first three OFDM symbols in one subframe by using the higher layer signaling, so that the uplink reference signal is sent in the first three OFDM symbols in the first subframe after the first subframe is determined. For example, in an embodiment, the first subframe and the at least one OFDM symbol may be configured as the last subframe in each radio frame and the last OFDM symbol by using the higher layer signaling.

In an optional embodiment, the uplink reference signal sending time determined by the terminal device in step 301 may include P OFDM symbols in a first subframe that are used to send the uplink reference signal, and P is a positive integer. Further, step 302 in which the terminal device is prohibited, on M1 first component carriers within the sending time, from sending an uplink signal includes: prohibiting, on the M1 first component carriers in Q consecutive OFDM symbols, the terminal device from sending the uplink signal, where the Q OFDM symbols include the P OFDM symbols, and Q>P and Q is a positive integer. For example, the terminal device activates three component carriers, a component carrier 0 and a component carrier 1 are first component carriers, and a component carrier 2 is a second component carrier. The terminal device sends the uplink reference signal on the component carrier 2 in last three OFDM symbols in the first subframe, and the terminal device is prohibited, on the component carrier 1 in last five OFDM symbols in the first subframe, from sending the uplink signal, namely, P=3 and Q=5. Certainly, the terminal device may be further prohibited, on the component carrier 1 in the last five OFDM symbols in the first subframe and first two OFDM symbols in a next subframe of the first subframe, from sending the uplink signal, namely, P=3 and Q=7. Different terminal devices have different processing capabilities, and due to a limited processing capability, a terminal device cannot implement zero-time switching. To be specific, the terminal device cannot send the uplink reference signal on the N1 component carriers at a same moment, and cannot be prohibited, on the M1 component carriers at the same moment, from sending the uplink signal. For example, the terminal device sends the uplink reference signal on the N1 component carriers at a first moment, but is not prohibited, on the M1 component carriers at the moment, from sending the uplink signal. In this case, a quantity of component carriers on which the uplink signal is sent at the same time may exceed a processing capability of the terminal device, causing a sending conflict, a sending failure, or the like. Therefore, a quantity Q of OFDM symbols in which sending of the uplink signal is prohibited on the M1 component carriers is greater than a quantity P of OFDM symbols in which the uplink reference signal is sent on the N1 component carriers, and the Q OFDM symbols in which sending of the uplink signal is prohibited on the M1 component carriers include the P OFDM symbols in which the uplink reference signal is sent on the N1 component carriers, so that a guard time can be reserved for the P OFDM symbols in which the uplink reference signal is sent, so as to avoid the sending conflict or the sending failure caused because the uplink reference signal is sent on the N1 component carriers at the same moment and sending of the uplink signal is prohibited on the M1 component carriers at the same moment.

Optionally, the Q OFDM symbols are dynamically set. For example, after determining the P OFDM symbols, the terminal device may add m OFDM symbols before the P OFDM symbols, and/or add n OFDM symbols after the P OFDM symbols, so as to form the Q OFDM symbols, and both m and n are positive integers. In other words, the Q OFDM symbols are m+P consecutive OFDM symbols, or P+n consecutive OFDM symbols, or m+P+n OFDM symbols.

In an optional embodiment, the terminal device receives first indication information from a network device, where the first indication information is used to indicate the N1 second component carriers, and/or the first indication information is used to indicate the M1 first component carriers. To be specific, the N1 second component carriers on which the terminal device sends the uplink reference signal within the sending time are indicated by the first indication information sent by the network device, and/or the M1 first component carriers on which the terminal device is prohibited, within the sending time, from sending the uplink signal are indicated by the first indication information sent by the network device.

Optionally, the first indication information includes carrier identifiers of the N1 second component carriers. For example, identifiers of five component carriers activated by the terminal device are respectively 0, 1, 2, 3, and 4. A component carrier 0 and a component carrier 1 are first component carriers, and a component carrier 2, a component carrier 3, and a component carrier 4 are second component carriers. The first indication information sent by the network device may include at least one of the identifiers 2, 3, and 4 of the component carriers. Optionally, the first indication information includes carrier identifiers of the M1 first component carriers. For example, the component carrier 0 and the component carrier 1 are the first component carriers. The first indication information may include at least one of the identifiers 0 and 1 of the component carriers. Certainly, an identifier of a component carrier is not limited thereto, and the component carrier of the terminal device may be represented by any identifier.

Optionally, the first indication information includes a bitmap (bitmap), the bitmap includes at least N bits, the N bits are corresponding to the N second component carriers, and the N bits are used to indicate the N1 second component carriers. For example, the terminal device activates five component carriers, a component carrier 0 and a component carrier 1 are first component carriers, and a component carrier 2, a component carrier 3, and a component carrier 4 are second component carriers. Therefore, three bits may be used to indicate the N1 second component carriers. The three bits are respectively corresponding to the component carrier 2, the component carrier 3, and the component carrier 4. If values of bits corresponding to the component carriers on which the uplink reference signal needs to be sent within the sending time are "1", "011" represents N1=2, namely, the N1 second component carriers are the component carrier 3 and the component carrier 4. Optionally, the bitmap may further include at least L bits, and the L bits are corresponding to L component carriers activated by the terminal device. In this case, the L bits are used to indicate the M1 first component carriers and the N1 second component carriers. For example, the component carrier 0 and the component carrier 1 are the first component carriers, and the component carrier 2, the component carrier 3, and the component carrier 4 are the second component carriers. If values of bits corresponding to the first component carriers on which sending of the uplink signal is prohibited within the sending time are "0", and values of bits corresponding to the second component carriers on which the uplink reference signal needs to be sent within the sending time are "1", "10100" represents M1=1, namely, the M1 first component carrier is the component carrier 1, and N1=1, namely, the N1 second component carrier is the component carrier 2.

Optionally, the N second component carriers are classified into a plurality of second component carrier groups, at least one of the second component carrier groups includes the N1 second component carriers, and the first indication information includes at least one bit to indicate one of the plurality of second component carrier groups. For example, the terminal device activates eight component carriers, a component carrier 0, a component carrier 1, and a component carrier 2 are first component carriers, and a component carrier 3 to a component carrier 7 are second component carriers. A second component carrier group 0 includes the component carrier 3 to the component carrier 5, and a second component carrier group 1 includes the component carrier 6 and the component carrier 7. When N1=3, namely, the N1 second component carriers include the component carrier 3 to the component carrier 5, the first indication information may include one bit indicating the second component carrier group 0, and the bit indicates the second component carrier group 0 by using a bit value "0".

In an optional embodiment, the first indication information is carried in a Media Access Control control element (MAC CE), a physical downlink control channel (PDCCH), or a radio resource control (RRC) message. For example, the first indication information is carried in the MAC CE. The MAC CE that carries the first indication information includes at least one bit, and the at least one bit is used to indicate at least one of the N1 second component carriers. A one-byte MAC CE may be used to indicate the N1 second component carriers, and the one-byte MAC CE includes eight bits, which are respectively denoted as a bit 0 to a bit 7. The bit 7 is used as a reserved bit, and one or more of seven bits, namely, the bits 0 to 6 are respectively corresponding to one or more of the N1 second component carriers, so that the N1 second component carriers are indicated based on values of the bits in the MAC CE. For example, the bits 0 to 6 are respectively corresponding to the component carrier 0 to the component carrier 6 activated by the terminal device. When bit values of the bits 0 to 6 are respectively "0001011", it indicates that N1=3, namely, the N1 component carriers are respectively the component carrier 3, the component carrier 5, and the component carrier 6, so that the terminal device sends the uplink reference signal on the component carrier 3, the component carrier 5, and the component carrier 6 within the sending time. Alternatively, the bit 3 is corresponding to the component carrier 6 activated by the terminal device. When a bit value of the bit 3 is "1", it indicates that the terminal device sends the uplink reference signal on the component carrier 6 within the sending time. In an optional embodiment, correspondences between the bits in the MAC CE and the component carriers activated by the terminal device may be configured by using the RRC message. In an optional embodiment, the MAC CE includes a plurality of bytes.

In an optional embodiment, the determining, by the terminal device, an uplink reference signal sending time includes: determining, by the terminal device, the uplink reference signal sending time according to the first indication information. To be specific, the first indication information may not only be used to indicate the N1 second component carriers, but also used to determine the uplink reference signal sending time. In an optional embodiment, the first subframe is a next subframe of a subframe in which the first indication information is received. In this case, the terminal device determines that the next subframe of the subframe in which the first indication information is received is the first subframe used to send the uplink reference signal, so as to send the uplink reference signal on the N1 second component carriers in one or more OFDM symbols in the determined first subframe.

In an optional embodiment, the first subframe is an $(n+k)^{th}$ subframe, a subframe in which the first indication information is received is a subframe n, k is preset and k is 0 or a positive integer, and n is an identifier of the subframe in which the first indication information is received. In this case, the terminal device receives the first indication information in the subframe n, and then the terminal device sends the uplink reference signal on the N1 second component carriers in one or more OFDM symbols in the $(n+k)^{th}$ subframe. For example, if k=0, the terminal device receives the first indication information in the subframe n, and then sends the uplink reference signal on the N1 second component carriers in the last OFDM symbol in the subframe n. For example, if k=5, the terminal device receives the first indication information in the subframe n, and then sends the uplink reference signal on the N1 second component carriers in one or more OFDM symbols in the fifth subframe after the subframe n, namely, an $(n+5)^{th}$ subframe.

In an optional embodiment, the first subframe is an $(n+k)^{th}$ subframe, an $n^{th}$ subframe is a subframe n in which the first indication information is received, the first indication information further includes sending time information and is used to indicate k, k is 0 or a positive integer, and n is an identifier of the subframe in which the first indication information is received. In this case, the terminal device receives the first indication information in the subframe n, and then the terminal device sends, based on the value k indicated by the first indication information, the uplink reference signal on the N1 second component carriers in one or more OFDM symbols in the $(n+k)^{th}$ subframe.

In an optional embodiment, the N second component carriers are classified into a plurality of second component carrier groups, at least one of the second component carrier groups includes the N1 second component carriers, and different second component carrier groups are corresponding to different first subframes. In this case, the first indication information received by the terminal device indicates one of the plurality of second component carrier groups. Therefore, the first subframe corresponding to the second component carrier group indicated by the first indication information may be determined based on correspondences between the different second component carrier groups and the different first subframes, so that the terminal device sends the uplink reference signal on the N1 second component carriers in the corresponding first subframe.

In an optional embodiment, before step 302 in which the terminal device sends an uplink reference signal on N1 second component carriers within the sending time, the method further includes: sending, by the terminal device, a preamble on at least one of the N1 second component carriers; and receiving, by the terminal device, a random access response (RAR) message corresponding to the preamble, where the RAR message includes information used to indicate an uplink timing advance (TA). In the foregoing manner, the terminal device sends the preamble to the network device on the at least one of the N1 second component carriers, then receives the RAR message, and obtains the uplink TA from the RAR message, so as to properly send, based on the obtained uplink TA, the uplink reference signal to the network device on the at least one of the N1 second component carriers.

It should be noted that, in this embodiment of the present invention, after sending the preamble on the at least one of the N1 second component carriers, the terminal device may receive, on at least one of the M first component carriers, TA information corresponding to the preamble, or may receive, on at least one of the N second component carriers, TA information corresponding to the preamble. This is not limited in the present invention.

In the foregoing implementation, the RAR message received by the terminal device based on the sent preamble includes uplink control information, for example, the uplink control information is an uplink grant (UL grant). However, the terminal device only needs to obtain the uplink TA, and does not need to schedule uplink data transmission based on the uplink control information. Therefore, optionally, the terminal device may ignore the uplink control information in the RAR message, in other words, does not identify the uplink control information in the RAR message, so as to reduce a processing procedure of the terminal device. Optionally, after the network device receives the preamble sent to the network device on the at least one of the N1 second component carriers, the network device may set a value corresponding to the uplink control information in the generated RAR message to "0", so as to reduce a processing procedure of the network device.

In an optional embodiment, the terminal device receives second indication information corresponding to the preamble, where the second indication information is used to indicate a TA, and the second indication information does not include uplink control information. In this case, after receiving the preamble on the at least one of the N1 second component carriers, the network device generates the second indication information, where the second indication information is used to indicate an uplink TA, and the second indication information does not include uplink control information, and the network device sends the second indication information to the terminal device on the at least one of the N1 second component carriers. To reduce a change to an existing system, after receiving the preamble on the at least one of the N1 second component carriers, the network device may generate an RAR message and send the RAR message to the terminal device, but the terminal device does not receive the RAR message, or after receiving the preamble on the at least one of the N1 second component carriers, the network device does not generate an RAR message. In the foregoing manner, the terminal device receives the second indication information, where the second indication information is used to indicate the uplink TA, and the second indication information does not include uplink control information. This may avoid configuring uplink control information for the component carrier on which scheduling of uplink data transmission is not required or not allowed.

In an optional embodiment, the second indication information is carried in a MAC CE. Optionally, the MAC CE that carries the second indication information includes a preset logical channel identifier (LCID). In this case, the preset LCID is corresponding to the second indication information, so that the terminal device can determine, based on the preset LCID, whether information carried in the received MAC CE is the second indication information.

Optionally, before the sending, by the terminal device, a preamble on at least one of the N1 second component carriers, the method further includes: receiving, by the terminal device, configuration information sent by the network device, where the configuration information is used to indicate a random access resource of the at least one of the N1 second component carriers; and receiving, by the terminal device, random access control information sent by the network device by using a physical downlink control channel (PDCCH), where the random access control information is used to trigger the terminal device to send the preamble.

Figure 4:
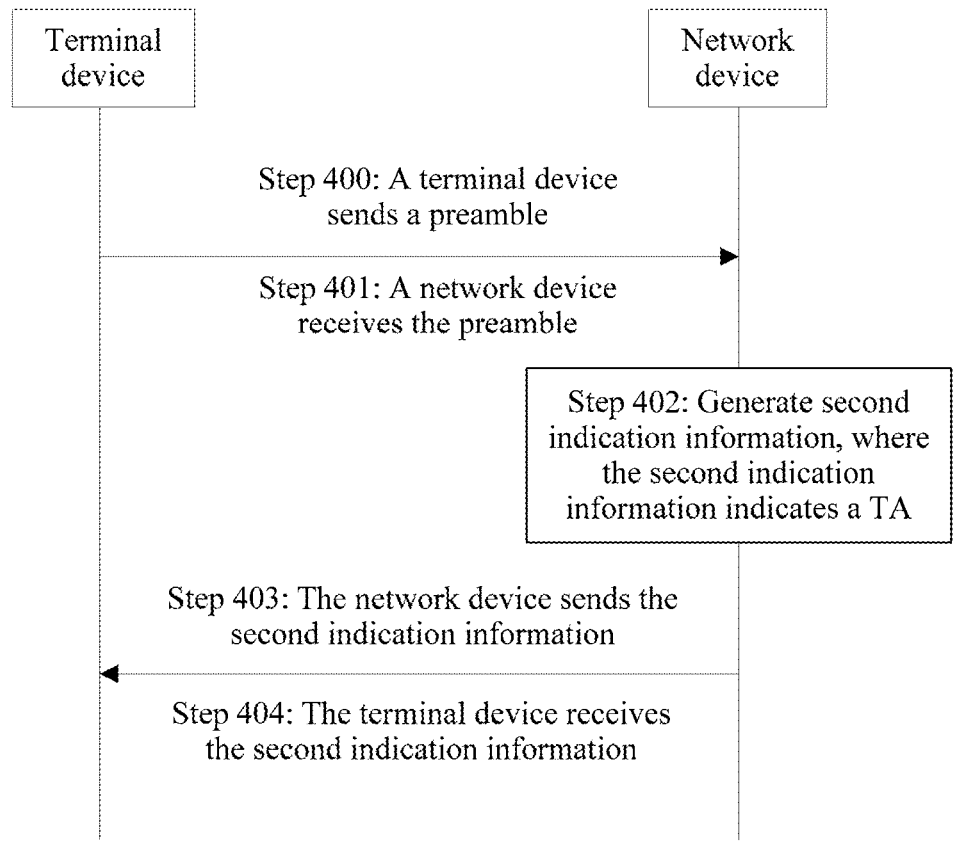
FIG. 4 is a second schematic example diagram according to an embodiment of the present invention.

FIG. 4 provides a method in which a terminal device obtains an uplink TA from a network device.

Step 400: The terminal device sends a preamble to the network device on at least one of activated second component carriers, where the second component carrier is a carrier on which scheduling of uplink data transmission is prohibited.

Step 401: The network device receives the preamble on the at least one second component carrier.

Step 402: The network device generates second indication information corresponding to the preamble, where the second indication information is used to indicate a TA.

Step 403: The network device sends the second indication information to the terminal device.

The network device may send the second indication information on at least one of M first component carriers, or may send the second indication information on at least one of N second component carriers. For example, the network device may send the second indication information to the terminal device on a primary carrier. This is not limited in the present invention.

Step 404: The terminal device receives the second indication information from the network device.

In the foregoing technical solution, the terminal device can send, to the network device, the preamble on the component carrier on which scheduling of uplink data transmission is prohibited, to obtain the uplink TA.

Optionally, the second indication information does not include uplink control information. Therefore, the terminal device receives the second indication information, where the second indication information is used to indicate the uplink TA, and the second indication information does not include uplink control information. This may avoid configuring uplink control information for the component carrier on which scheduling of uplink data transmission is not required or not allowed. Optionally, the second indication information is carried in a MAC CE, and an LCID of the MAC CE is corresponding to the second indication information. Optionally, the LCID is preset. Optionally, the second indication information is an RAR message, and a value corresponding to uplink control information in the RAR message is "0".

Optionally, the second indication information is an RAR message, and the terminal device ignores uplink control information in the RAR message.

Optionally, before the terminal device sends the preamble on the at least one of the activated second component carriers, the terminal device receives configuration information from the network device, where the configuration information is used to indicate a random access resource of the at least one second component carrier; and the terminal device receives random access control information sent by the network device by using a physical downlink control channel PDCCH, where the random access control information is used to trigger the terminal device to send the preamble.

The method in which the terminal device obtains the uplink TA from the network device and that is provided in FIG. 4 may be performed by a terminal device and a network device (for example, the UE and the eNodeB in FIG. 2).

For example, a terminal device that may perform the method in FIG. 4 is provided, and the terminal device includes a processor and a transceiver.

The transceiver is configured to send a preamble to a network device on at least one of activated second component carriers, where the second component carrier is a carrier on which scheduling of uplink data transmission is prohibited.

The transceiver is further configured to receive, from the network device, second indication information corresponding to the preamble, where the second indication information is used to indicate a TA.

For example, a network device that may perform the method in FIG. 4 is provided, and the network device includes a processor and a transceiver.

The transceiver is configured to receive a preamble from a terminal device on at least one second component carrier, where the second component carrier is a carrier on which scheduling of uplink data transmission is prohibited.

The processor is configured to generate second indication information corresponding to the preamble, where the second indication information is used to indicate a TA.

The transceiver is further configured to send the second indication information to the terminal device.

It should be noted that, for an implementation in which the terminal device obtains the uplink TA from the network device and a specific implementation in which the network device indicates the TA to the terminal device, refer to descriptions in the method embodiments. The embodiments of the terminal device and the network device are based on a same concept as the foregoing method embodiments, and technical effects brought by the terminal device and the network device are the same as those of the foregoing method embodiments. For specific content, refer to the descriptions in the foregoing method embodiments, and details are not described herein again.

Figure 5:
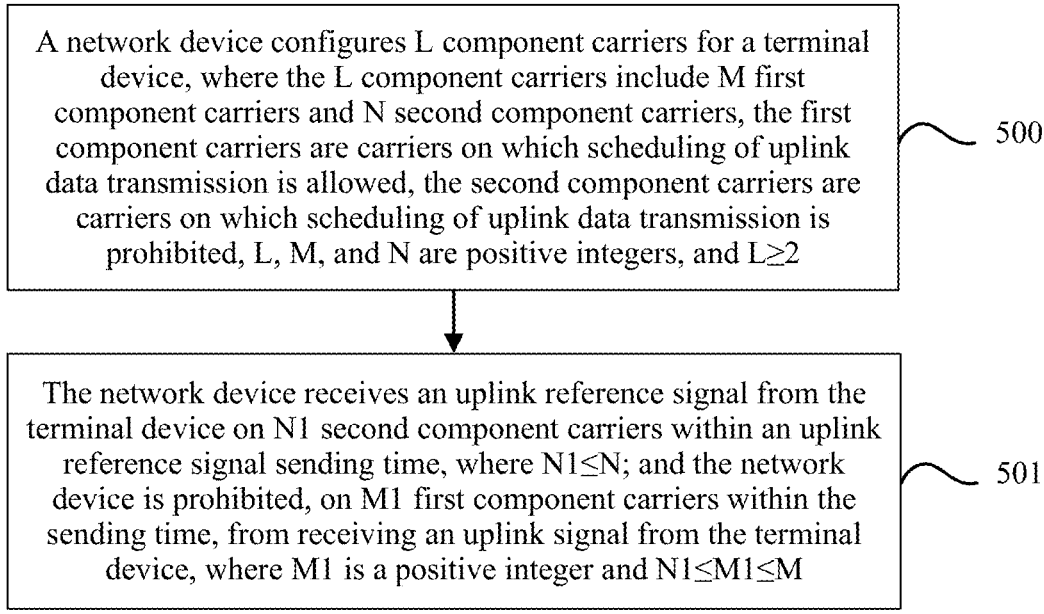
FIG. 5 is a third schematic example diagram according to an embodiment of the present invention.

FIG. 5 is a flowchart of an uplink reference signal receiving method according to an embodiment of the present invention. The method in FIG. 5 is performed by a network device (for example, the eNodeB in FIG. 2). It should be noted that the method may be used as a separate embodiment, or may be used together with the foregoing uplink reference signal sending method. Unless otherwise specified, for the same content of this embodiment as the foregoing embodiment, refer to a description in the foregoing embodiment. Details are not described herein again. This embodiment includes the following steps:

Step 500: The network device configures L component carriers for a terminal device, where the L component carriers include M first component carriers and N second component carriers, the first component carriers are carriers on which scheduling of uplink data transmission is allowed, the second component carriers are carriers on which scheduling of uplink data transmission is prohibited, L, M, and N are positive integers, and $L \geq 2$.

Step 501: The network device receives an uplink reference signal from the terminal device on N1 second component carriers within an uplink reference signal sending time, where N1 is a positive integer and $N1 \leq N$; and the network device determines that there is no uplink signal of the terminal device on M1 first component carriers within the sending time, where M1 is a positive integer and $N1 \leq M1 \leq M$.

Optionally, before step 501, the network device receives the sending time from the terminal device, and the sending time is a time that is determined by the terminal device and that is used to send the uplink reference signal.

In an optional embodiment, the receiving, by the network device, an uplink reference signal on N1 second component carriers within a sending time includes: receiving, by the network device, the uplink reference signal on the N1 second component carriers in P OFDM symbols in a first subframe; and the determining, by the network device, that there is no uplink signal of the terminal device on M1 first component carriers within the sending time includes: determining, by the network device, that there is no uplink signal of the terminal device on the M1 first component carriers in Q consecutive OFDM symbols, where the Q OFDM symbols include the P OFDM symbols, and $Q > P$.

In an optional embodiment, before the receiving, by the network device, an uplink reference signal on N1 second component carriers within a sending time, the method further includes: receiving, by the network device, a preamble on at least one of the N1 second component carriers; and sending, by the network device, a random access response (RAR) message on the at least one second component carrier on which the preamble is received, where the RAR message includes information used to indicate an uplink timing advance (TA). In the foregoing manner, the network device receives the preamble from the terminal device on the at least one of the N1 second component carriers, and then sends the RAR message on the at least one second component carrier, so that the terminal device obtains the uplink TA from the RAR message, so as to properly send, based on the obtained uplink TA, the uplink reference signal to the network device on the at least one of the N1 second component carriers.

Optionally, the network device sends second indication information on the at least one second component carrier on which the preamble is received, where the second indication information is used to indicate a TA, and the second indication information does not include uplink control information. In this case, after receiving the preamble on the at least one of the N1 second component carriers, the network device generates the second indication information, where the second indication information is used to indicate the TA, and the second indication information does not include uplink control information, and the network device sends the second indication information to the terminal device on the at least one of the N1 second component carriers.

Optionally, the network device sends second configuration information to the terminal device, where the second configuration information is used to indicate a random access resource of the at least one of the N1 second component carriers; and the network device sends random access control information to the terminal device by using a second PDCCH, where the random access control information is used to trigger the terminal device to send the preamble.

An embodiment of the present invention further provides a terminal device, so as to implement the foregoing embodiment. It should be noted that the terminal device can perform the method in the foregoing embodiment. Therefore, for specific details of the terminal device, refer to a description in the foregoing embodiment. For brevity, same content is not described below again.

Figure 6:
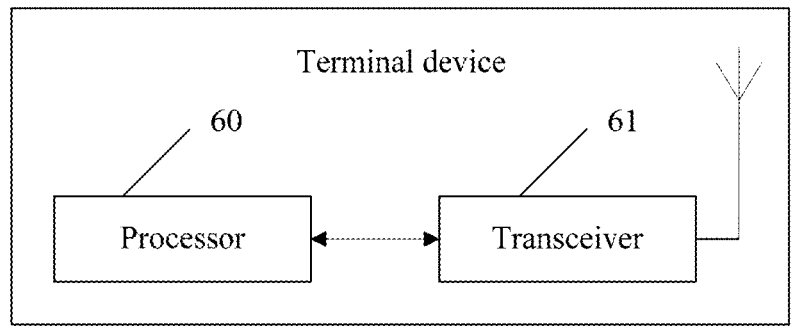
FIG. 6 is a schematic structural diagram of a first terminal device according to an embodiment of the present invention.

As shown in FIG. 6, the terminal device may include a processor and a transceiver. Certainly, the terminal device may further include a memory and the like.

The processor is configured to: activate L component carriers, where the L component carriers include M first component carriers and N second component carriers, the first component carriers are carriers on which scheduling of uplink data transmission is allowed, the second component carriers are carriers on which scheduling of uplink data transmission is prohibited, L, M, and N are positive integers, and L≥2; and determine an uplink reference signal sending time.

The transceiver is configured to send an uplink reference signal on N1 second component carriers within the sending time, where N1 is a positive integer and N1≤N.

The processor is configured to be prohibited, on M1 first component carriers within the sending time, from sending an uplink signal, where M1 is a positive integer and N1≤M1≤M.

An embodiment of the present invention further provides another terminal device, so as to implement the foregoing embodiment. It should be noted that the terminal device can perform the method in the foregoing embodiment. Therefore, for specific details of the terminal device, refer to a description in the foregoing embodiment. For brevity, same content is not described below again.

Figure 7:
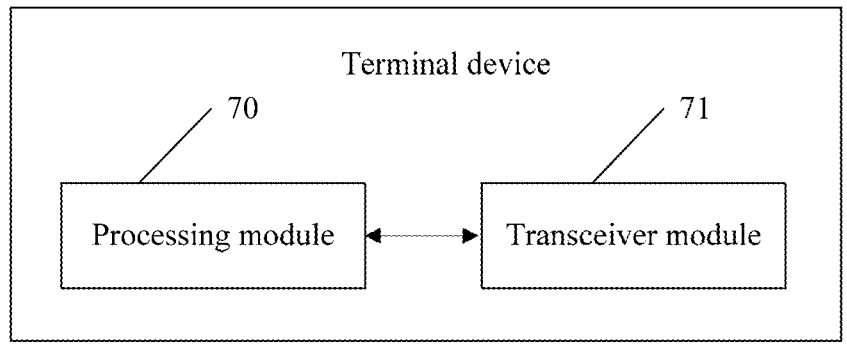
FIG. 7 is a schematic structural diagram of a second terminal device according to an embodiment of the present invention.

As shown in FIG. 7, the terminal device may include a processing module and a transceiver module. Certainly, the terminal device may further include a storage module and the like.

The processing module is configured to: activate L component carriers, where the L component carriers include M first component carriers and N second component carriers, the first component carriers are carriers on which scheduling of uplink data transmission is allowed, the second component carriers are carriers on which scheduling of uplink data transmission is prohibited, L, M, and N are positive integers, and L≥2; and determine an uplink reference signal sending time.

The transceiver module is configured to send an uplink reference signal on N1 second component carriers within the sending time, where N1 is a positive integer and N1≤N.

The processing module is configured to be prohibited, on M1 first component carriers within the sending time, from sending an uplink signal, where M1 is a positive integer and N1≤M1≤M.

In an optional embodiment, the transceiver or the transceiver module is further configured to receive first indication information from a network device, where the first indication information is used to indicate the N1 second component carriers, and/or the first indication information is used to indicate the M1 first component carriers.

It should be noted that, for a specific implementation in which the terminal device activates the L component carriers, sends the uplink reference signal on the N1 second component carriers within the determined sending time, and is prohibited, on the M1 first component carriers within the determined sending time, from sending the uplink signal, refer to a description in the method embodiment. This embodiment of the terminal device is based on a same concept as the foregoing method embodiment, and a technical effect brought by the terminal device is the same as that of the method embodiment of the present invention. For specific content, refer to the description in the method embodiment of the present invention, and details are not described herein again.

An embodiment of the present invention further provides a network device, so as to implement the foregoing embodiment. It should be noted that the network device can perform the method in the foregoing embodiment. Therefore, for specific details of the network device, refer to a description in the foregoing embodiment. For brevity, same content is not described below again.

Figure 8:
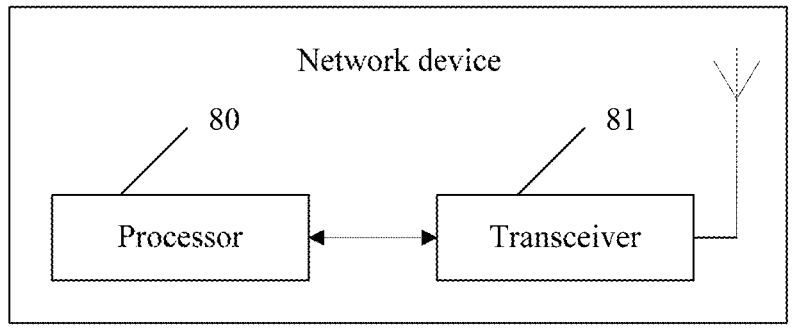
FIG. 8 is a schematic structural diagram of a first network device according to an embodiment of the present invention.

As shown in FIG. 8, the network device may include a processor and a transceiver. Certainly, the network device may further include a memory and the like.

The processor is adapted to configure L component carriers for a terminal device, where the L component carriers include M first component carriers and N second component carriers, the first component carriers are carriers on which scheduling of uplink data transmission is allowed, the second component carriers are carriers on which scheduling of uplink data transmission is prohibited, L, M, and N are positive integers, and L≥2.

The transceiver is configured to receive an uplink reference signal from the terminal device on N1 second component carriers within an uplink reference signal sending time, where N1≤N.

The processor is configured to determine that there is no uplink signal of the terminal device on M1 first component carriers within the sending time, where M1 is a positive integer and N1≤M1≤M.

An embodiment of the present invention further provides another network device, so as to implement the foregoing embodiment. It should be noted that the network device can perform the method in the foregoing embodiment. Therefore, for specific details of the network device, refer to a description in the foregoing embodiment. For brevity, same content is not described below again.

Figure 9:
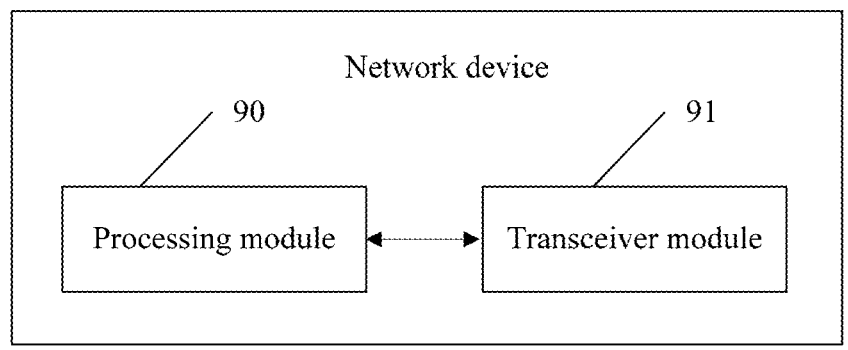
FIG. 9 is a schematic structural diagram of a second network device according to an embodiment of the present invention.

As shown in FIG. 9, the network device may include a processing module and a transceiver module. Certainly, the network device may further include a storage module and the like.

The processing module is adapted to configure L component carriers for a terminal device, where the L component carriers include M first component carriers and N second component carriers, the first component carriers are carriers on which scheduling of uplink data transmission is allowed, the second component carriers are carriers on which scheduling of uplink data transmission is prohibited, L, M, and N are positive integers, and L≥2.

The transceiver module is configured to receive an uplink reference signal from the terminal device on N1 second component carriers within an uplink reference signal sending time, where N1≤N.

The processing module is configured to determine that there is no uplink signal of the terminal device on M1 first component carriers within the sending time, where M1 is a positive integer and N1≤M1≤M.

In an optional embodiment, the transceiver or the transceiver module is further configured to send first indication information to the terminal device, where the first indication information is used to indicate the N1 second component carriers, and/or the first indication information is used to indicate the M1 first component carriers.

It should be noted that, for a specific implementation in which the network device configures the L component carriers for the terminal device, receives the uplink reference signal from the terminal device on the N1 second component carriers within the uplink reference signal sending time, and is prohibited, on the M1 first component carriers within the sending time, from receiving the uplink signal from the terminal device, refer to a description in the method embodiment. This embodiment of the network device is based on a same concept as the foregoing method embodiment, and a technical effect brought by the network device is the same as that of the method embodiment of the present invention. For specific content, refer to the description in the method embodiment of the present invention, and details are not described herein again.

In addition, in a machine-type communications technology, a low-cost terminal device or a terminal device in a coverage enhancement mode uses an asynchronous HARQ in an uplink direction. After the terminal device sends uplink data, the network device does not send feedback information of the corresponding data. If the network device fails to receive the uplink data, the network device instructs, by using an explicit uplink grant, the terminal device to re-send the uplink data. An asynchronous HARQ mechanism is also introduced in a licensed-assisted access system.

Compared with a synchronous HARQ, an asynchronous HARQ process used at a transmission time interval is not associated with the transmission time interval, but the HARQ process used at the transmission time interval is determined by using an identifier that is of the HARQ process and that is carried in an uplink grant. Therefore, the uplink grant used to schedule new uplink transmission or uplink retransmission performed by the terminal device needs to carry the identifier of the HARQ process that needs to be used by the terminal device.

In a random access process, the terminal device sends uplink data based on the uplink grant included in a random access response. If the network device fails to receive the uplink data, the network device may be configured to instruct, by using an explicit uplink grant, the terminal device to retransmit the uplink data.

In this case, if the random access process is a contention-based random access process, the network device masks, by using a temporary cell radio network temporary identity, the explicit uplink grant used to instruct the terminal device to retransmit the uplink data. If the random access process is a non-contention-based random access process, the network device masks, by using a cell radio network temporary identity of the terminal device, the explicit uplink grant used to instruct the terminal device to retransmit the uplink data.

The terminal device retransmits the uplink data after receiving the explicit uplink grant.

However, because the uplink grant included in the random access response does not carry the identifier of the HARQ process, the terminal device cannot determine, based on the identifier of the HARQ process, the HARQ process of sending the uplink data. In addition, the network device does not know which HARQ process is used by the terminal device to send the uplink data. Further, when sending the explicit uplink grant used to instruct the terminal device to retransmit the uplink data, the network device cannot determine the identifier that is of the HARQ process and that is included in the explicit uplink grant used to instruct the terminal device to retransmit the uplink data. The terminal device may fail to retransmit the uplink data if the identifier that is of the HARQ process and that is included in the explicit uplink grant used to instruct the terminal device to retransmit the uplink data is inconsistent with the HARQ process in which the terminal device sends the uplink data based on the uplink grant in the random access response, affecting random access performance.

Embodiments of the present invention provide an uplink data sending method, an uplink data receiving method, and an apparatus, so as to complete uplink data sending and retransmission, thereby ensuring random access performance.

In an embodiment, an uplink data sending method is provided, including:

sending, by a terminal device, a random access preamble;

receiving, by the terminal device, a random access response, where the random access response includes a first uplink grant; and sending, by the terminal device, uplink data based on the first uplink grant, where the terminal device sends the uplink data by using a pre-configured hybrid automatic repeat request HARQ process.

Optionally, after the sending, by the terminal device, uplink data, the method further includes:

receiving, by the terminal device, a second uplink grant, where the second uplink grant includes an identifier of the pre-configured HARQ process; and retransmitting, by the terminal device, the uplink data by using the pre-configured HARQ process based on the second uplink grant.

Optionally, if the HARQ process is used for sending both the uplink data and other uplink data, the terminal device sends the uplink data by using the HARQ process; and further, optionally, the terminal device clears the other uplink data from a cache corresponding to the HARQ process.

Optionally, after the sending, by the terminal device, uplink data, the method further includes:

receiving, by the terminal device, a second uplink grant, where the second uplink grant does not include an identifier of the HARQ process; and retransmitting, by the terminal device, the uplink data by using the pre-configured HARQ process based on the second uplink grant.

Optionally, after the sending, by the terminal device, uplink data, the method further includes:

receiving, by the terminal device, a second uplink grant, where the second uplink grant includes an identifier of any HARQ process; and ignoring, by the terminal device based on the second uplink grant, the identifier that is of the HARQ process and that is included in the second uplink grant, and retransmitting the uplink data by using the pre-configured HARQ process.

Optionally, the identifier of the pre-configured hybrid automatic repeat request HARQ process may be 0 or 1, or may be selected by the terminal device.

In an embodiment, an uplink data receiving method is provided, including:

receiving, by a network device, a random access preamble;

sending, by the network device, a random access response, where the random access response includes a first uplink grant; and receiving, by the network device, uplink data sent by a terminal device based on the first uplink grant, where the terminal device sends the uplink data by using a pre-configured hybrid automatic repeat request HARQ process.

Optionally, after the network device receives the uplink data, if the network device fails to receive the uplink data, the method further includes:

sending, by the network device, a second uplink grant, where the second uplink grant includes an identifier of the pre-configured HARQ process; and receiving, by the network device, the uplink data retransmitted by the terminal device by using the pre-configured HARQ process based on the second uplink grant.

Optionally, after the network device receives the uplink data, if the network device fails to receive the uplink data, the method further includes:

sending, by the network device, a second uplink grant, where the second uplink grant does not include an identifier of the HARQ process; and receiving, by the network device, the uplink data retransmitted by the terminal device by using the pre-configured HARQ process based on the second uplink grant.

Optionally, after the network device receives the uplink data, if the network device fails to receive the uplink data, the method further includes:

sending, by the network device, a second uplink grant, where the second uplink grant includes an identifier of any HARQ process; and receiving, by the network device, the uplink data retransmitted by the terminal device by using the pre-configured HARQ process based on the second uplink grant, where the terminal device ignores the identifier that is of the HARQ process and that is included in the second uplink grant.

Optionally, the identifier of the pre-configured hybrid automatic repeat request HARQ process may be 0 or 1, or may be selected by the terminal device.

In an embodiment, a terminal device is provided, including a transceiver.

The transceiver is configured to send a random access preamble.

The transceiver is configured to receive a random access response, where the random access response includes a first uplink grant.

The transceiver is configured to send uplink data based on the first uplink grant, where the transceiver sends the uplink data by using a pre-configured hybrid automatic repeat request HARQ process.

Optionally, the transceiver is further configured to: if the HARQ process is used for sending both the uplink data and other uplink data, send the uplink data by using the HARQ process; and further, optionally, clear the other uplink data from a cache corresponding to the HARQ process.

Optionally, after the terminal device sends the uplink data, the transceiver is further configured to:

receive a second uplink grant, where the second uplink grant includes an identifier of the pre-configured HARQ process; and retransmit the uplink data by using the pre-configured HARQ process based on the second uplink grant.

Optionally, after the terminal device sends the uplink data, the transceiver is further configured to:

receive a second uplink grant, where the second uplink grant does not include an identifier of the HARQ process; and retransmit the uplink data by using the pre-configured HARQ process based on the second uplink grant.

Optionally, after the terminal device sends the uplink data, the transceiver is further configured to:

receive a second uplink grant, where the second uplink grant includes an identifier of any HARQ process; and ignore, based on the second uplink grant, the identifier that is of the HARQ process and that is included in the second uplink grant, and retransmit the uplink data by using the pre-configured HARQ process.

Optionally, the identifier of the pre-configured hybrid automatic repeat request HARQ process may be 0 or 1, or may be selected by the terminal device.

In an embodiment, a network device is provided, including a transceiver.

The transceiver is configured to receive a random access preamble.

The transceiver is configured to send a random access response, where the random access response includes a first uplink grant.

The transceiver is configured to receive uplink data sent by a terminal device based on the first uplink grant, where the terminal device sends the uplink data by using a pre-configured hybrid automatic repeat request HARQ process.

Optionally, after the network device receives the uplink data, if the network device fails to receive the uplink data, the transceiver is further configured to:

send a second uplink grant, where the second uplink grant includes an identifier of the pre-configured HARQ process; and receive the uplink data retransmitted by the terminal device by using the pre-configured HARQ process based on the second uplink grant.

Optionally, after the network device receives the uplink data, if the network device fails to receive the uplink data, the transceiver is further configured to:

send a second uplink grant, where the second uplink grant does not include an identifier of the HARQ process; and receive the uplink data retransmitted by the terminal device by using the pre-configured HARQ process based on the second uplink grant.

Optionally, after the network device receives the uplink data, if the network device fails to receive the uplink data, the transceiver is further configured to:

send a second uplink grant, where the second uplink grant includes an identifier of any HARQ process; and receive the uplink data retransmitted by the terminal device by using the pre-configured HARQ process based on the second uplink grant, where the terminal device ignores the identifier that is of the HARQ process and that is included in the second uplink grant.

Optionally, the identifier of the pre-configured hybrid automatic repeat request HARQ process may be 0 or 1, or may be selected by the terminal device.

In this embodiment of the present invention, the terminal device easily determines which HARQ process is used to transmit the uplink data. In addition, the network device also easily determines which HARQ process is used to instruct the terminal device to retransmit the uplink data, so as to ensure reliability of the uplink data, and avoid a problem that because the identifier of the HARQ process is added to the uplink grant in the random access response, a size of a random access response message is increased, and the terminal device cannot properly receive the random access response message.

It should be noted that this embodiment of the present invention is applicable to any system that uses an asynchronous HARQ, and is not limited to machine-type communications.

It should be understood that, the processor in all the embodiments of the present invention may be a central processing unit (CPU), or may further be another general purpose processor, a digital signal processor (DSP), an application-specific integrated circuit (ASIC), a field programmable gate array (FPGA), or another programmable logical device, discrete gate or transistor logical device, discrete hardware component, or the like. In addition, the network device and the terminal device in the foregoing embodiments of the present invention may further include a component such as a memory. The memory herein may include a read-only memory and a random access memory, and provide an instruction and data for the processor. A part of the memory may further include a non-volatile random access memory. For example, the memory may further store information of a device type. The processor invokes instruction code in the memory, so as to control other modules of the network device and the terminal device in the embodiments of the present invention to perform the foregoing operations.

It should be understood that "an embodiment", "one embodiment", or "this embodiment of the present invention" mentioned in the whole specification does not mean that particular features, structures, or characteristics related to the embodiment are included in at least one embodiment of the present invention. Therefore, "in an embodiment", "in one embodiment", or "in this embodiment of the present invention" appearing throughout the specification does not refer to a same embodiment. In addition, these particular features, structures, or characteristics may be combined in one or more embodiments by using any appropriate manner.

It should be understood that sequence numbers of the foregoing processes do not mean execution sequences in various embodiments of the present invention. The execution sequences of the processes should be determined based on functions and internal logic of the processes, and should not be construed as any limitation on the implementation processes of the embodiments of the present invention.

In addition, the terms "system" and "network" may be used interchangeably in this specification. It should be understood that, the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that in the embodiments of this application, "B corresponding to A" indicates that B is associated with A, and B may be determined based on A. However, it should further be understood that determining A based on B does not mean that B is determined based on A only; that is, B may also be determined based on A and/or other information.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example based on functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

In the embodiments of this application, the displayed or discussed mutual couplings or direct couplings or communication connections may be implemented by using some interfaces. The indirect couplings or communication connections between the apparatuses or units may be implemented in electronic, mechanical, or other forms.

The foregoing units as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

When the integrated unit is implemented in the form of a software function unit and sold or used as an independent product, the integrated unit may be stored in a computer-readable storage medium. Based on such an understanding, the technical solutions of the present invention essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. An uplink reference signal sending method, comprising:
activating, by a terminal device, L component carriers, wherein the L component carriers comprise M first component carriers and N second component carriers, wherein the first component carriers are carriers on which scheduling of uplink data transmission is allowed, wherein the second component carriers are carriers on which scheduling of uplink data transmission is prohibited, wherein L, M, and N are positive integers, and wherein L≥2;
receiving, by the terminal device, first indication information from a network device, wherein the first indication information indicates N1 second component carriers, wherein N1 is a positive integer and 2≤N1≤N, wherein the N second component carriers are classified into a plurality of second component carrier groups, wherein at least one of the plurality of second component carrier groups comprises the N1 second component carriers, and wherein the first indication information comprises at least one bit to indicate the at least one of the plurality of second component carrier groups;
sending, by the terminal device, a preamble on at least one of the N1 second component carriers;
receiving, by the terminal device, a random access response (RAR) message corresponding to the preamble, wherein the RAR message comprises information used to indicate an uplink timing advance (TA);
determining, by the terminal device, an uplink reference signal sending time;
sending, by the terminal device, an uplink reference signal on the N1 second component carriers within the uplink reference signal sending time; and
prohibiting, on M1 first component carriers within the uplink reference signal sending time, the terminal device from sending an uplink signal, wherein M1 is a positive integer and N1≤M1≤M.

2. The method according to claim 1, wherein the uplink reference signal sending time comprises at least one orthogonal frequency division multiplexing (OFDM) symbol that is in a first subframe and that is used to send the uplink reference signal.

3. The method according to claim 1, wherein the first indication information is carried in a first physical downlink control channel (PDCCH).

4. The method according to claim 2, wherein the first subframe or the at least one OFDM symbol is configured by using higher layer signaling.

5. The method according to claim 1, before the sending, by the terminal device, a preamble on at least one of the N1 second component carriers, further comprising:
receiving, by the terminal device, configuration information from the network device, wherein the configuration information is used to indicate a random access resource of the at least one of the N1 second component carriers; and
receiving, by the terminal device, random access control information from the network device by using a second PDCCH, wherein the random access control information is used to trigger the terminal device to send the preamble.

6. An apparatus, comprising:
at least one processor; and
a non-transitory computer-readable storage medium coupled to the at least one processor and storing programming instructions for execution by the at least one processor, the programming instructions instruct the apparatus to:
activate L component carriers, wherein the L component carriers comprise M first component carriers and N second component carriers, wherein the first component carriers are carriers on which scheduling of uplink data transmission is allowed, wherein the second component carriers are carriers on which scheduling of uplink data transmission is prohibited, wherein L, M, and N are positive integers, and wherein L≥2;
receive first indication information from a network device, wherein the first indication information indicates N1 second component carriers, wherein N1 is a positive integer and 2≤N1≤N, wherein the N second component carriers are classified into a plurality of second component carrier groups, wherein at least one of the plurality of second component carrier groups comprises the N1 second component carriers, and wherein the first indication information comprises at least one bit to indicate the at least one of the plurality of second component carrier groups;
send a preamble on at least one of the N1 second component carriers;
receive a random access response (RAR) message corresponding to the preamble, wherein the RAR message comprises information used to indicate an uplink timing advance (TA);
determine an uplink reference signal sending time;
send an uplink reference signal on the N1 second component carriers within the uplink reference signal sending time; and
prohibit, on M1 first component carriers within the uplink reference signal sending time, from sending an uplink signal, wherein M1 is a positive integer and N1≤M1≤M.

7. The apparatus according to claim 6, wherein the uplink reference signal sending time comprises at least one orthogonal frequency division multiplexing (OFDM) symbol that is in a first subframe and that is used to send the uplink reference signal.

8. The apparatus according to claim 6, wherein the first indication information is carried in a first PDCCH.

9. The apparatus according to claim 7, wherein the first subframe or the at least one OFDM symbol is configured by using higher layer signaling.

10. A non-transitory computer-readable storage medium comprising instructions which, when executed by a computer, cause the computer to:
activate L component carriers, wherein the L component carriers comprise M first component carriers and N second component carriers, wherein the first component carriers are carriers on which scheduling of uplink data transmission is allowed, wherein the second component carriers are carriers on which scheduling of uplink data transmission is prohibited, wherein L, M, and N are positive integers, and wherein L≥2;
receive first indication information from a network device, wherein the first indication information indicates N1 second component carriers, wherein N1 is a positive integer and 2≤N1≤N, wherein the N second component carriers are classified into a plurality of second component carrier groups, wherein at least one of the plurality of second component carrier groups comprises the N1 second component carriers, and wherein the first indication information comprises at least one bit to indicate the at least one of the plurality of second component carrier groups;

send a preamble on at least one of the N1 second component carriers;

receive a random access response (RAR) message corresponding to the preamble, wherein the RAR message comprises information used to indicate an uplink timing advance (TA);

determine an uplink reference signal sending time;

send an uplink reference signal on the N1 second component carriers within the uplink reference signal sending time; and prohibit, on M1 first component carriers within the uplink reference signal sending time, from sending an uplink signal, wherein M1 is a positive integer and $N1 \leq M1 \leq M$.

11. The storage medium according to claim 10, wherein the uplink reference signal sending time comprises at least one orthogonal frequency division multiplexing (OFDM) symbol that is in a first subframe and that is used to send the uplink reference signal.

12. The storage medium according to claim 10, wherein the first indication information is carried in a first physical downlink control channel (PDCCH).

13. The apparatus according to claim 6, wherein the programming instructions instruct the apparatus to:
before the sending a preamble on at least one of the N1 second component carriers, receive configuration information from the network device, wherein the configuration information is used to indicate a random access resource of the at least one of the N1 second component carriers; and receive random access control information from the network device by using a second PDCCH, wherein the random access control information is used to trigger the apparatus to send the preamble.

* * * * *